United States Patent [19]
Miyawaki

[11] Patent Number: 6,055,037
[45] Date of Patent: Apr. 25, 2000

[54] PHOTOGRAPHIC PRINTING METHOD AND PHOTOGRAPHIC PRINTING SYSTEM FOR PHOTOGRAPHIC FILM STORED IN A CARTRIDGE

[75] Inventor: Hiroshi Miyawaki, Wakayama, Japan

[73] Assignee: Noritsu Koki Co., Ltd., Wakayama-ken, Japan

[21] Appl. No.: 09/157,642

[22] Filed: Sep. 21, 1998

[30] Foreign Application Priority Data

Sep. 24, 1997 [JP] Japan ................................. 9-258082

[51] Int. Cl.$^7$ .......................... G03B 27/52; G03D 11/00
[52] U.S. Cl. ............................. 355/40; 355/41; 396/564
[58] Field of Search .............................. 355/28, 27, 29, 355/40, 41; 396/620, 624, 564

[56] References Cited

U.S. PATENT DOCUMENTS

| | | | |
|---|---|---|---|
| 5,119,126 | 6/1992 | Tokuda ........................................ | 355/41 |
| 5,447,827 | 9/1995 | Ishikawa et al. ......................... | 430/434 |
| 5,576,794 | 11/1996 | DeMarti, Jr. et al. .................... | 396/620 |
| 5,752,114 | 5/1998 | Saito et al. ................................. | 396/429 |
| 5,831,714 | 11/1998 | Yoshikawa .................................. | 355/40 |
| 5,896,293 | 4/1999 | Teramoto et al. .................. | 364/468.18 |

FOREIGN PATENT DOCUMENTS

| | | |
|---|---|---|
| 0793142 | 3/1997 | European Pat. Off. . |
| 950083 | 2/1997 | Japan . |

*Primary Examiner*—Alan A. Mathews
*Assistant Examiner*—Hung Henry Nguyen
*Attorney, Agent, or Firm*—Fulbright & Jaworski, LLP

[57] ABSTRACT

A photographic printing system for a photographic film stored in a cartridge with a cartridge ID. This system includes a receiving unit for receiving the cartridge storing the photographic film, the receiving unit having an information input for inputting first printing information on the photographic film as linked with the cartridge ID of the cartridge, a printer/processor unit, and an information controller for communicating, by using the cartridge ID as a key, with the receiving unit and the printer/processor unit, to control and record printing information for the cartridge ID. The printer/processor unit includes an information reader for reading second printing information recorded on the photographic film drawn out of the cartridge, and a printing processor. Third printing information is generated from partial printing information read by the information reader and partial printing information inputted by the receiving unit. The printing processor prints images of the photographic film on printing paper based on the third printing information.

4 Claims, 11 Drawing Sheets

PHOTOGRAPHIC PRINTING METHOD AND PHOTOGRAPHIC PRINTING SYSTEM FOR PHOTOGRAPHIC FILM STORED IN A CARTRIDGE

BACKGROUND OF THE INVENTION

1. Field of the Invention

This invention relates to a photographic printing method and photographic printing system for a photographic film stored in a cartridge.

2. Description of the Related Art

A user takes a photographic film such as negative film used in photography to a photo shop (hereinafter called an agency) and orders prints. The photographic film used in photography usually is put to predetermined processes such as color development and fixation. The developed images on the photographic film are printed on printing paper to obtain printed photographs. The agency having received the order from the user transmits the photographic film to a developing laboratory for processing the film. The processes are carried out at the laboratory to obtain prints as noted above, and the developed photographic film and prints are handed over to the user. The above processing for developing and printing photographic film at the same time is called simultaneous printing.

After receiving the developed film and prints, the user may place a reorder (for additional prints or the like). The photographic film for which the reorder is made receives the same processes as in the simultaneous printing except that the film is not developed this time. The processing for only printing photographic film is called re-order.

A photographic printing system capable of simultaneous printing and reorder processing is known from Japanese Patent Laying-Open Publication H9-50083, for example. According to this system, when a photographic film for simultaneous printing is received through an order receiving unit, a series of processes is executed by a film processor unit for negative development, a printing/processor unit for printing, and so on. When a photographic film for a reorder is received, a series of processes is executed by the printer/processor unit for reorder printing, and so on. Such a system must carry out the simultaneous printing and reorder printing based on printing information such as frame designation, the number of prints, print sizes and the like. The system disclosed in the above publication utilizes magnetic recording layers provided on the film as a medium for communicating the information among the different processing units.

However, with the photographic printing system using the magnetic layers on the film as the information medium among the different processing units, necessary information is read and used at each processing stage. Information may frequently be written or read at each processing unit. The processing may become uncertain or unreliable due to reading errors or the like.

In such a photographic printing system, information on the photographic film, prints to be obtained and so on is dispersed to a plurality of processing units within the system, without being centrally controlled. It is therefore difficult to grasp a processing state of the entire photographic printing system. There is room for improvement in this respect.

SUMMARY OF THE INVENTION

The object of this invention is to provide a technique for enabling free use of information necessary for printing photographic film among different processing units constituting a photographic printing system.

The above object is fulfilled, according to this invention, by a photographic printing method for a photographic film stored in a cartridge, comprising the steps of reading and storing a cartridge ID recorded on the cartridge for identifying the cartridge, and communicating, by using the cartridge ID as a key, with processing units in a processing unit group for processing the photographic film, in a timed relationship with each operation of the processing unit group, to control operations of the processing units.

With this method, each printing step of a photographic printing system may be controlled by means of the cartridge ID. That is, information necessary to processing of the photographic film may be controlled as linked to the cartridge ID, and may be shared by the varied units constituting the system. As distinct from a film ID recorded on the film, for example, the cartridge ID can be seen directly from outside the cartridge. Thus, the cartridge ID has the advantage of being transcribed on a slip or the like for handling convenience.

The communication using the cartridge ID as a key, noted above, refers to a practice of incorporating the cartridge ID into data relating to printing information transmitted among the processing units. This enables a reliable grasp of stages of treatment as the cartridge or photographic film is handled by one processing unit after another.

Preferably, such control based on the cartridge ID is carried out at least at a receiving unit for receiving a print order and at a delivery unit for delivering finished prints, namely at stations of contact with the customer.

In an embodiment of this invention, a film ID applied to the photographic film per se is read and compared with the cartridge ID, to collate the film ID and the cartridge ID. This collation enable a confirmation that a particular photographic film taken out of the cartridge is, after a number of processing steps, correctly returned to the original cartridge. Preferably, an alarm is given when a disagreement occurs between the film ID and the cartridge ID in time of collation.

In the embodiment of this invention, printing information is linked with the cartridge ID when the print order is received by the receiving unit. The printing information may include, for example, print frame, number of prints, print size and customer information. By linking such information with the cartridge ID, the printing information need not be recorded on magnetic layers formed on the film, for example. The information may also be controlled centrally.

In another aspect of this invention, the foregoing object is fulfilled by a photographic printing system for a photographic film stored in a cartridge with a cartridge ID, comprising:

a receiving unit for receiving the cartridge storing the photographic film, the receiving unit having an information input for inputting first printing information on the photographic film as linked with the cartridge ID of the cartridge;

a printer/processor unit including:

a cartridge loader for loading the cartridge containing the photographic film after being developed, and reading the cartridge ID from the cartridge;

a loading unit for drawing the photographic film out of the cartridge loaded into the cartridge loader;

an information reader for reading second printing information recorded on the photographic film drawn out of the cartridge, wherein third printing information is generated from partial printing information read by the information reader and partial printing information inputted by the receiving unit; and a printing processor for printing images of the photographic film on printing paper based on the third printing information, and outputting printing result information; and an information controller for communicating, by using the cartridge ID as a key, with the receiving unit and the printer/processor unit in timed relationship with operations thereof, to control and record printing information for the cartridge ID.

With this construction, the varied processing units can utilize the printing information acquired through the receiving unit and the printing information linked to the cartridge ID. Since the information is centrally controlled, the processing situation of the entire system may be grasped with ease. The information may be read from the photographic film only once, thereby to diminish the chance of errors occurring in the reading operation to realize processing with increased reliability.

The photographic printing system may, as usual, further comprise a detach unit for taking the photographic film out of the cartridge for development, a photographic film processor unit for developing the photographic film, and an attach unit for placing the photographic film after being developed back in the cartridge where the photographic film was stored. The detach unit, photographic film processor unit and attach unit may be adapted capable of communicating with the information controller by using the cartridge ID as a key. Then, the printing information generated or required by these units may be centrally controlled by the information controller through the network.

In the embodiment of this invention, the printer/processor unit has a recorder for recording the cartridge ID read by the cartridge loader on the printing paper. The printing paper may then by linked to the film and cartridge corresponding thereto by using the cartridge ID. This facilitates a confirmation that the film and prints are linked correctly, to achieve a printing process with increased accuracy.

In the embodiment of this invention, the printer/processor unit has a paper processor for developing the printing paper and sorting the printing paper for each photographic film, and an index printer for preparing an index print. These paper processor and index printer may also exchange information with the other processing units, to realize a more comprehensive control of the printing information.

The photographic printing system may further comprise a slip issue unit for issuing a slip based on the print result information outputted by the printing processor and the information inputted by the receiving unit, and a delivery unit for delivering a combination of the photographic film, finish prints, and the slip issued by the slip issue unit, the slip issue unit and delivery unit being capable of communicating with the information controller by using the cartridge ID as a key. Then, the photographic film, finished prints and slip may be collated based on the cartridge ID.

Generally, the communication between the information controller and each processing unit is carried out through an ordinary LAN. However, one of various other data transmission modes may be used.

Other features and advantages of this invention will be apparent from the following description of the embodiment to be taken with reference to the drawings.

DESCRIPTION OF THE PREFERRED EMBODIMENT

Figure 1:
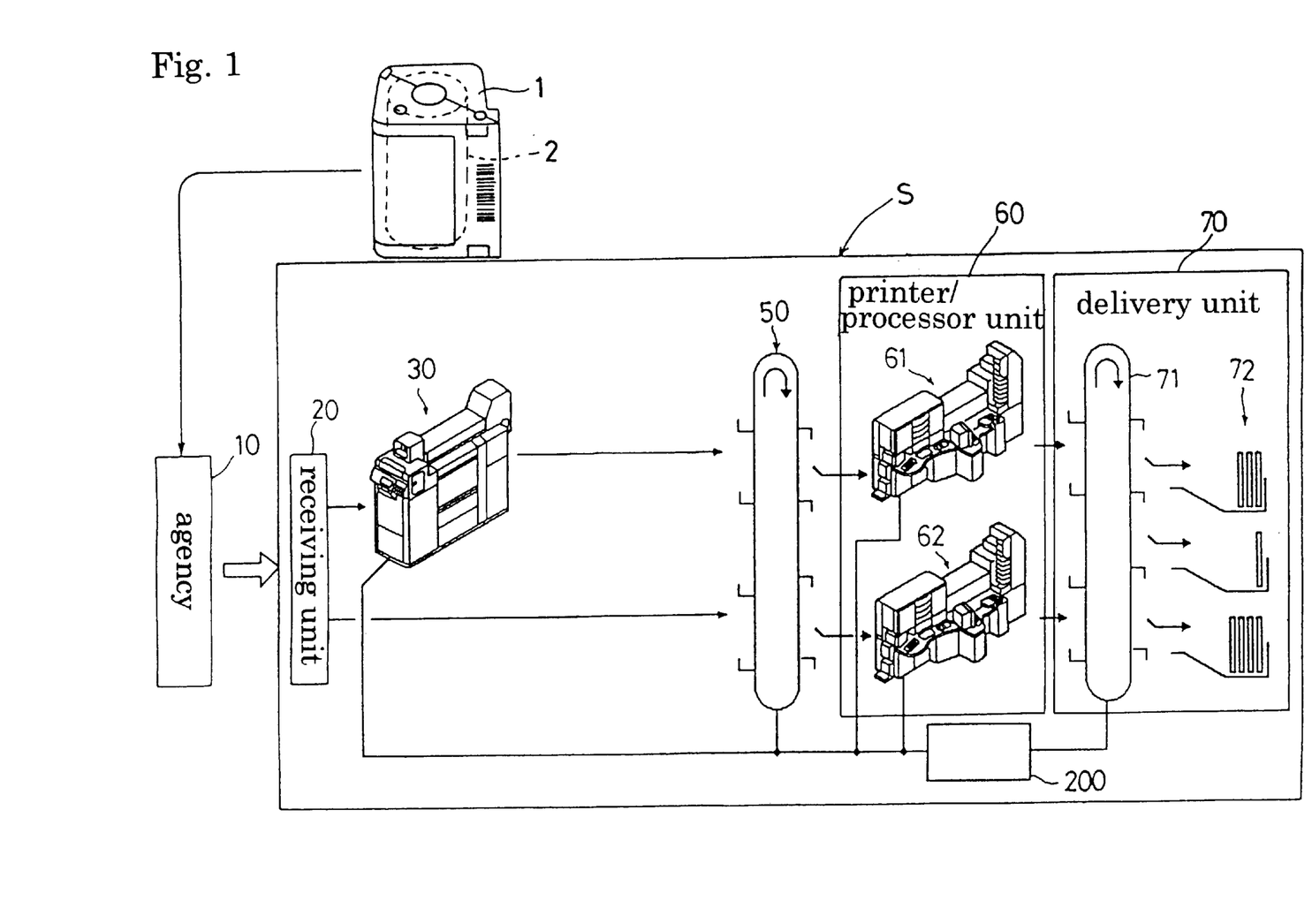
FIG. 1 is a schematic overall view of a photo processing system according to this invention.
Figure 2:
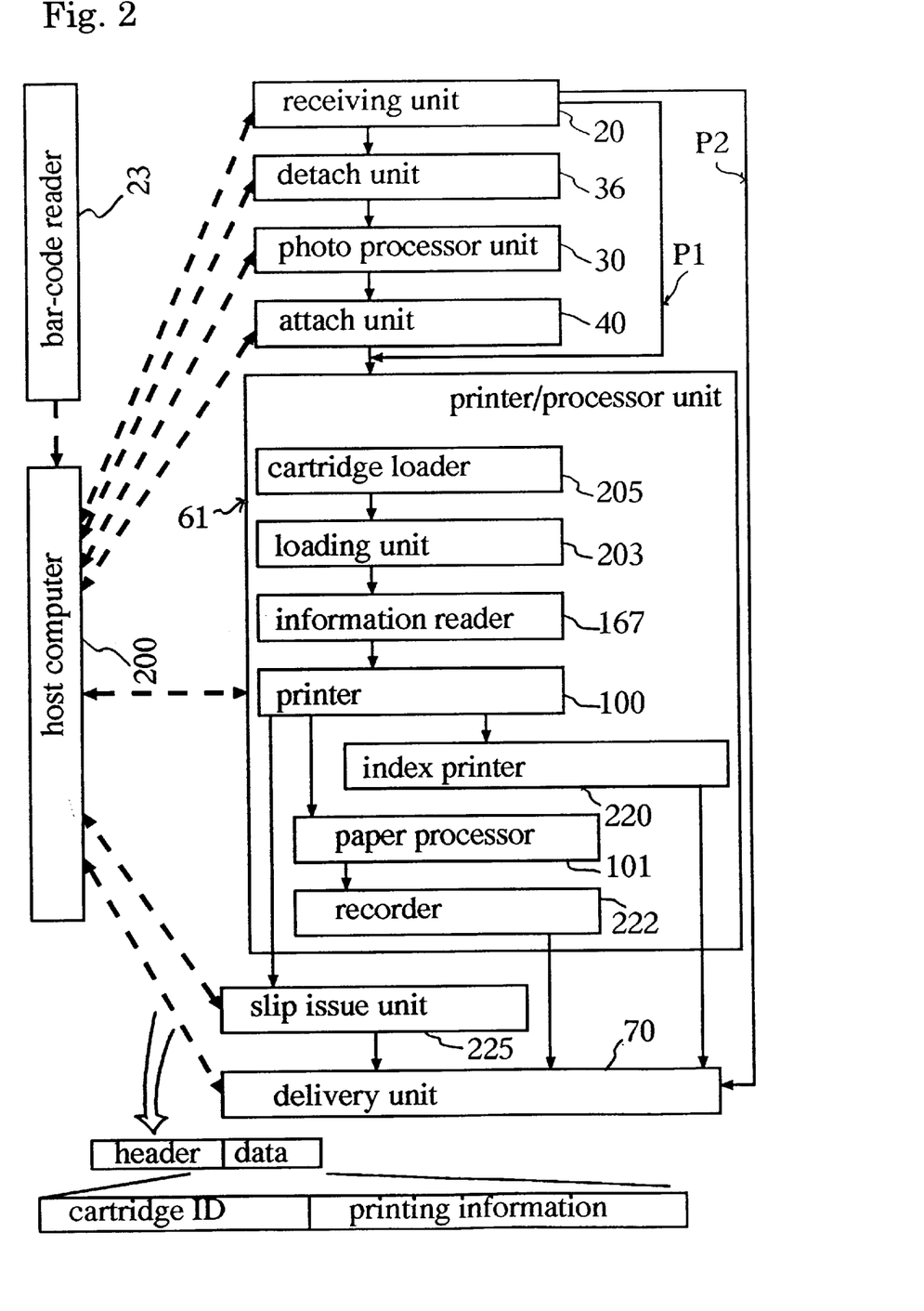
FIG. 2 is a block diagram showing flows of information and film in the photo processing system.

FIG. 1 shows processes performed of a photographic film in a cartridge 1 brought to an agency 10 and forwarded to a photo laboratory having a photo processing system S. In the following description, the photo processing system and the photo laboratory are regarded as one and affixed with reference S. FIG. 2 is an explanatory view showing varied processing units constituting the photo processing system S, and flows of printing information, film and printing paper among these units. The flows of the printing information among these units are shown in dotted lines. The data transmitted includes headers representing addresses of the processing units acting as destinations, and data showing the printing information. The printing information always includes a cartridge ID. Thus, a central control may be made of various printing information by using the cartridge ID as a key.

There are mainly two types of photographic film 2 and film container 1 on the market. They are a well-known, 135 type film stored in a cartridge acting as a film holder, and an IX240 type film 2 stored in a cartridge 1 acting as a film container, the latter film being based on APS developed recently. This embodiment will be described, taking the IX240 type photographic film 2 stored in the cartridge 1 and having magnetic information recording areas thereon.

The agency 10 may receive a request for development and printing of undeveloped photographic film 2 (simultaneous printing), or a request for additional printing or the like of developed photographic film 2 (reorder). In the case of the IX240 type film, the photographic film 2 after being developed is placed in the special cartridge 1 when returned to the customer.

Figure 4:
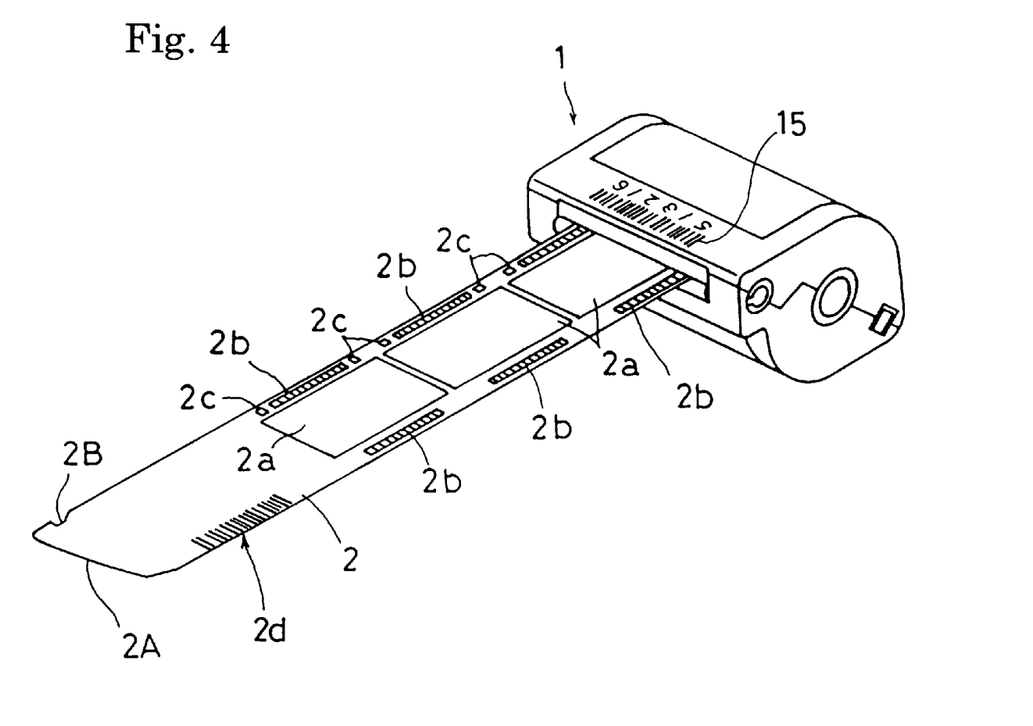
FIG. 4 is a perspective view of magnetic information recording areas on an IX240 type photographic film and a cartridge thereof.

As shown in FIG. 4, the IX240 type photographic film 2 has magnetic layers forming magnetic information recording areas 2b above and below image areas 2a. The magnetic information recording areas arranged above the image areas 2a are called a lab track for recording data to be used in processing the film. The magnetic information recording areas arranged below the image areas 2a are called a camera track for recording information on photos taken with a camera. A leader portion between the forward end 2A and image areas 2a includes a film ID 2d in the form of a bar code recorded on the lab track. The magnetic information recording areas 2b arranged above frames in the image areas 2a have recorded therein information on the corresponding frames.

Figure 3:
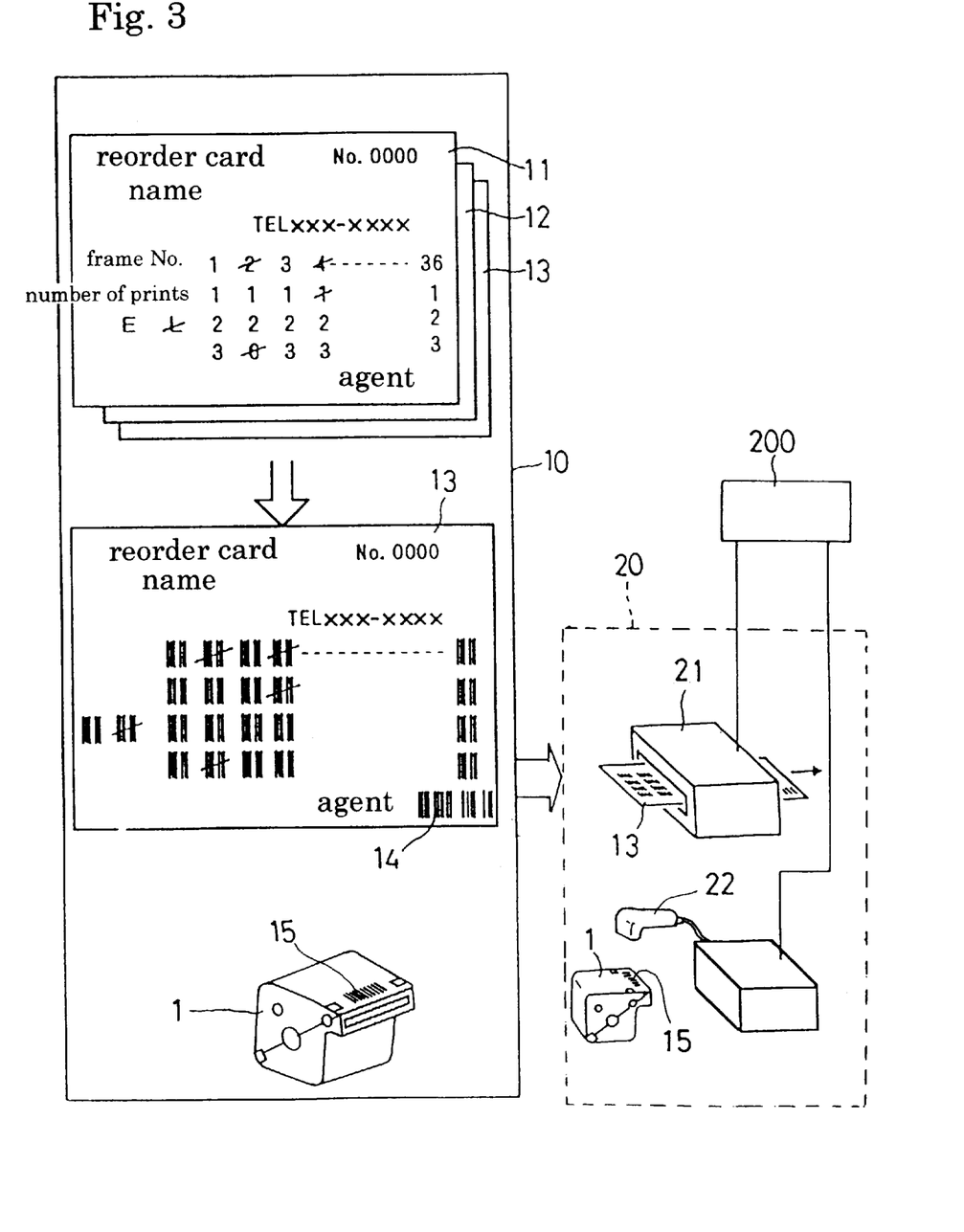
FIG. 3 is an explanatory view illustrating an operation at a photo agency and a reception process carried out in time of a reorder.

When the customer brings the photographic film 2 to the agency 10 of photo laboratory S and requests development and/or printing, the agency 10 accepts the photographic film 2 and issues a pressure sensitive order slip in three sheets as shown in FIG. 3. This order slip includes a sheet 11 given to the customer for his or her keeping, a confirmation sheet 12 kept at the agency 10, and a sheet 13 given to the photo laboratory S along with the photographic film 2.

FIG. 3 shows an order slip issued against a reorder. This order slip includes printing information selected by the customer, such as "frame No.", "number of prints", "print size" and "printing paper surface condition" in the form of a plurality of bar codes. The slip further includes columns for entering customer information such as the name, address and telephone number, as well as the name of agency 10. The sheet 13 given to the lab includes also a shop name bar code 14 representing an ID code of agency 10.

The cartridge 1 has a cartridge ID recorded as a bar code 15 on a surface above a film opening thereof and including a bar code number. This bar code number is written in a form readable by a bar-code reader, on the order slip issued against a reorder or an order for simultaneous printing, in order to collate this order slip with the photographic film 2 brought in by the customer.

Once the bar code number of the cartridge ID has been written as above, the sheet 13 and photographic film 2 given to the lab, even when separated from each other, may be collated by using the cartridge ID as a key. Thus, the sheet 13 for the lab and the photographic film 2 may be separately transmitted from the agency 10 to the photo laboratory S.

The sheet 13 and photographic film 2 transmitted to the photo laboratory S are put to a reception process at a receiving unit 20. At the receiving unit 20, a on-slip bar-code reader 21 reads, from the sheet 13, frames to be printed, numbers of prints, print sizes and so on which are example of printing information recorded in bar codes, the shop name bar code 14 and the bar code number. The receiving unit 20 is connected to a host computer 200 through a network. The printing information is transmitted to the host computer 200 which acts as an information controller of the photo processing system installed in the photo laboratory S. The cartridge ID of cartridge 1 is read by a barcode reader 22 and inputted to the host computer 200. These bar-code readers 21 and 22 constitute an information input unit. The host computer 200 stores the printing information as associated with the cartridge ID in memory.

At this point, undeveloped photographic film 2 for simultaneous printing and developed photographic film 2 for reorder follow processing routes different in respect of only a developing process. That is, in FIG. 2, the undeveloped photographic film 2 for simultaneous printing is transported to a detach unit 36 of a photo processor unit 30 shown in FIG. 5 to be developed there. The developed photographic film 2 for reorder is transported directly to the printer/processor unit as shown in a handling path P1.

Figure 5:
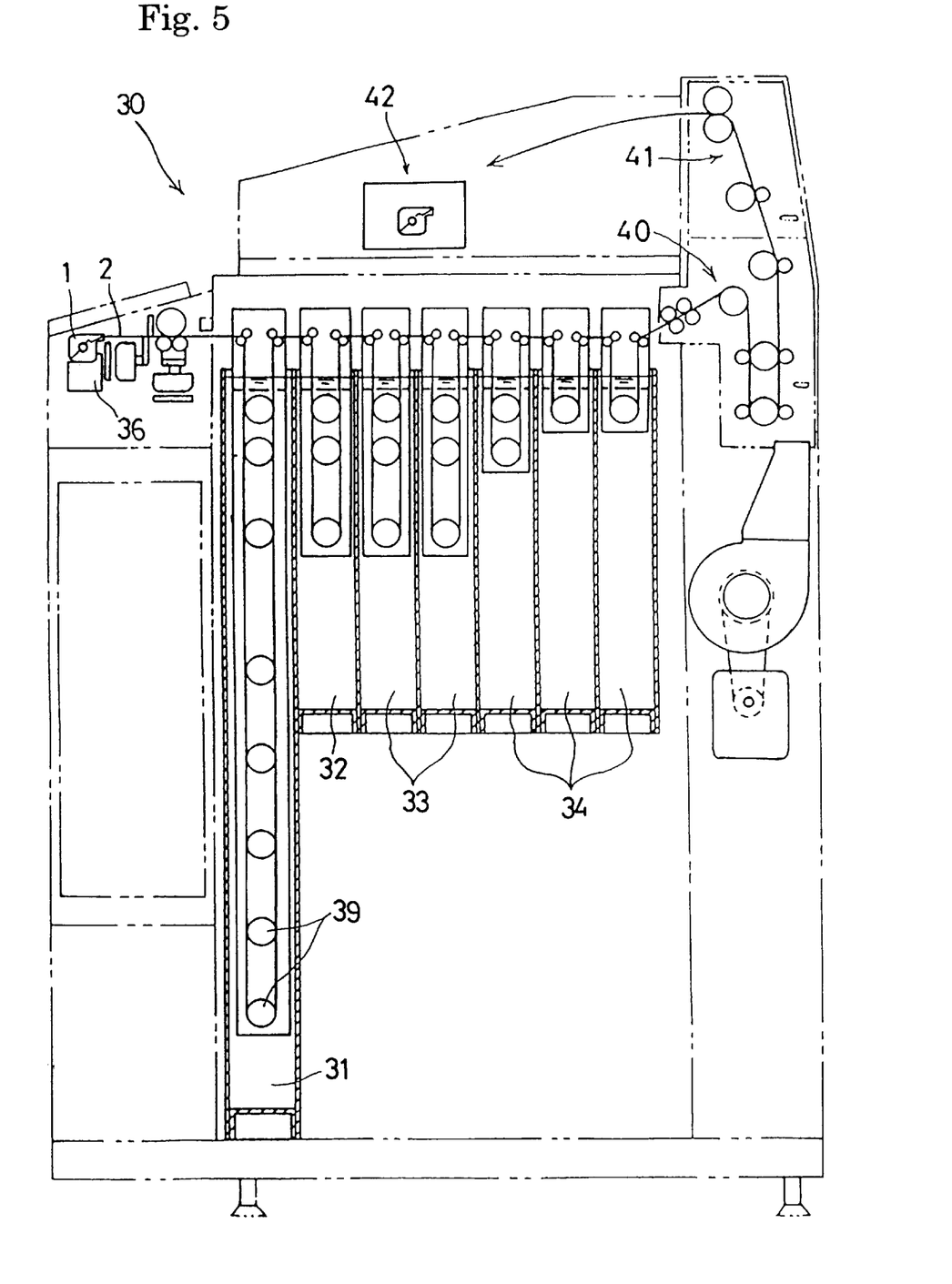
FIG. 5 is a sectional view of a photographic film processor unit.

As shown in FIG. 5, the photo processor unit 30 includes the detach unit 36 for loading the photographic film 2 and taking the photographic film 2 out of the cartridge 1, a developing section having processing tanks for developing the photographic film 2 fed from the detach unit 36, a film drying section 40 for drying the developed photographic film 2 with warm air heated by a drying heater and blown by a drying fan, an outlet 41 for discharging the dried photographic film 2, and an attach unit 42 for storing the photographic film 2 discharged, back into the cartridge 1 where the photographic film 2 was stored originally.

The film processor unit 30 will be described in greater detail next. The photographic film 2 taken out is transported as pinched by a transport roller and idle rollers from the detach unit 36 to the developing section. The developing section includes seven processing tanks filled with treating solutions such as a developer, a bleaching solution, a fixing solution and stabilizing solution, respectively, for successively performing developing processes such as development, bleaching, fixation and so on, and transport roller units 39 having different lengths for transporting the photographic film 2. The seven processing tanks 31–35 are arranged in order in a transport direction of the photographic film 2. The first deep tank is a processing tank 31 storing the developer. The next is a processing tank 32 storing the bleaching solution. The next two are processing tanks 33 storing the fixing solution. The three shallow tanks are processing tanks 34 storing the stabilizing solution.

The photographic film 2 developed in the developing section is transported through the film drying section 40 and outlet 41 to the attach unit 42 where the photographic film 2 is put back into the cartridge 1 where the photographic film 2 was stored originally. The attach unit 42 includes a bar-code reader for reading the cartridge ID of cartridge 1, and a bar-code reader for reading the bar code (film ID) recorded on the film 1. Results of reading of the two bar codes are outputted to the host computer 200. When the cartridge ID on the film 1 and the film ID recorded on the film 1 are found to disagree with those associated at the receiving unit 20, the host computer 200 gives a warning to the operator. This precludes possibility of the photographic film 2 being placed in a cartridge other than the original cartridge 1.

As seen from FIG. 2, the detach unit 36, photographic film processor unit 30 and attach unit 42 are all connected to the host computer 200 for communication therewith. Thus, the host computer 200 can grasp processing situations of photographic film 2. In this embodiment, the detach unit 36 and attach unit 42 are integrated with the processor unit 30, but may be formed separately therefrom. Further, the photographic film 2 taken out at the detach unit 36 may be placed in an intermediate cartridge for developing purposes different from the cartridge 1, and thereafter stored in the original cartridge 1.

Figure 6:
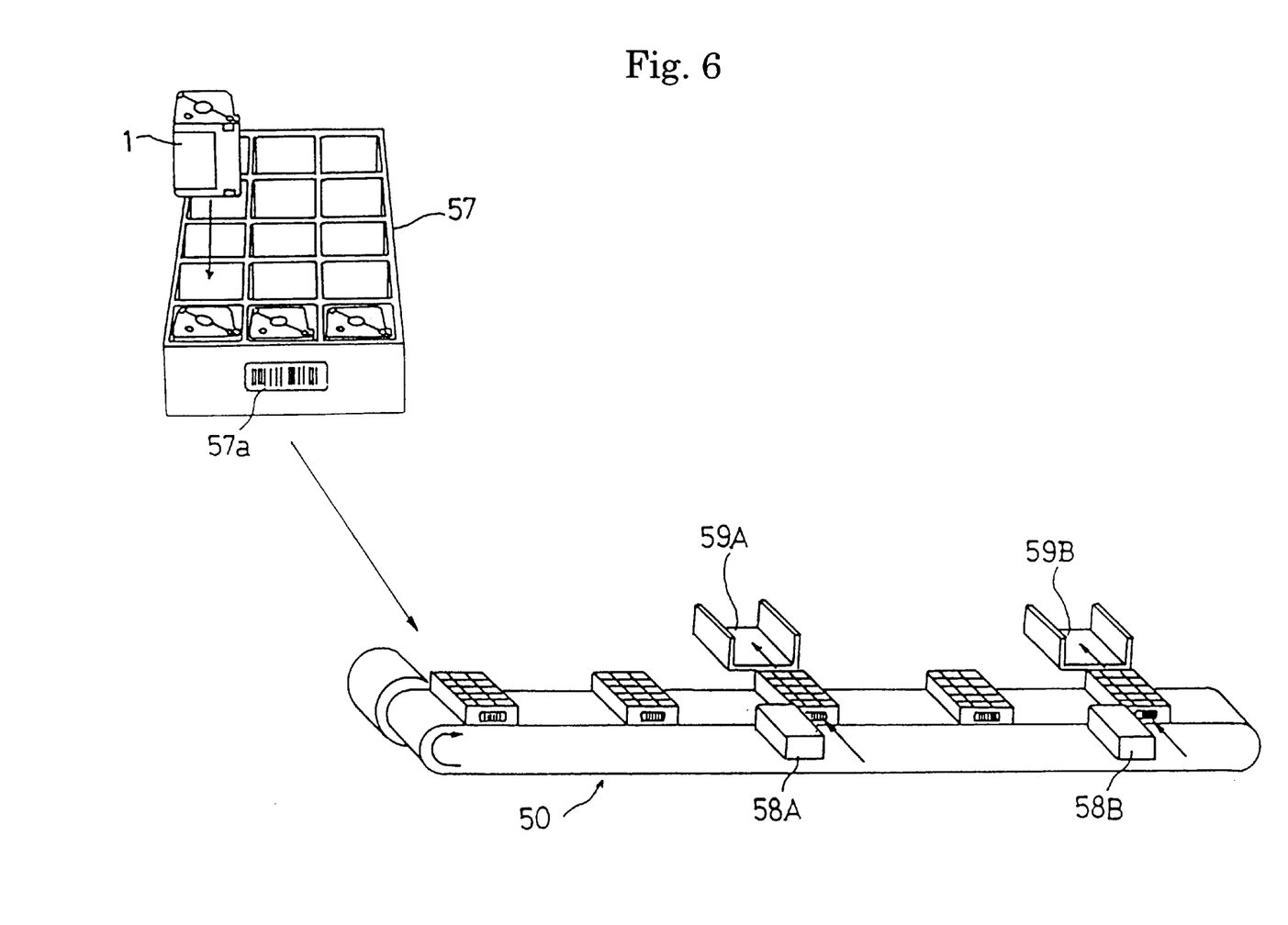
FIG. 6 is a schematic view of a transport device.

Next, the photographic film 2 for reorder, or photographic film 2 developed by the photographic film processor 30, stored in the cartridge 1, is placed in a transport box 57 shown in FIG. 6, to be transported by a transport device 50 to a next, printing station 60.

In this embodiment, the printing station 60 includes two printer/processor units 61 and 62 for performing an efficient printing process based on the print information on the photographic film 2. Efficiency of the printing process is achieved by using, for example, the printer/processor unit 61 for making ordinary size prints, and the printer/processor unit 62 for making panorama prints on different size printing paper.

For this purpose, when placed on the transport device 50 shown in FIG. 6, the cartridge 1 is sorted in the transport box 57 based on the print information. The transport box 57 is identified by a bar code 57a applied to a front surface thereof. This bar code 57a is read by a bar-code reader 58A or 59B which provides information for automatically pushing the transport box 57 into i standby opening 59A or 59B corresponding to an appropriate one of the printer/processor units 61 or 62, for processing by the printer/processor unit 61 or 62.

Figure 7:
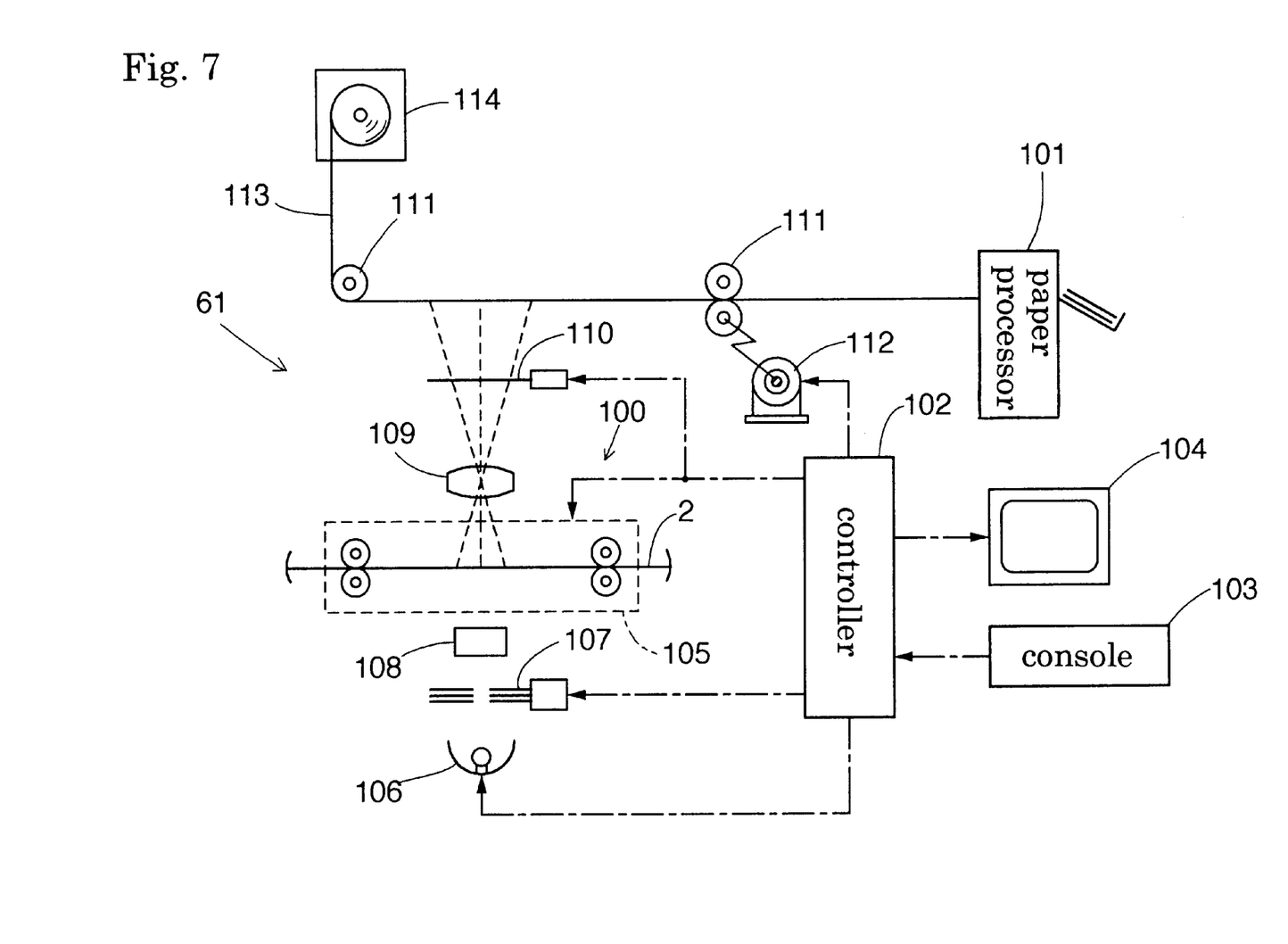
FIG. 7 is a schematic view of a printer/processor unit.

The two printer/processor units 61 and 62 have the same construction. Their construction will be described, taking the printer/processor unit 61 for example. As shown in FIG. 7, the printer/processor unit 61 includes a printing station 100 for printing image information of film 2 on printing paper 113 and outputting results of printing as printing result information, a paper processor 101 for developing exposed printing paper 113 and sorting the developed printing paper 113 for each photographic film 2, and a controller 102 for controlling operation of each component and communicating with the host computer 200. The controller 102 has, connected thereto, a console 103 for inputting various control instructions, and a monitor 104 for displaying image information and the like read at a scanning station 115 described hereinafter.

The printing station 100 includes an exposing light source 106, a light adjustment filter 107 for adjusting a color balance of irradiating light emitted from the exposing light source 106, with yellow, magenta and cyan filters movable into and out of an exposing optical path, a mirror tunnel 108 for uniformly mixing the colors of the light after the color balance adjustment through the light adjustment filter 107, a printing lens 109 for forming images of image information of film 2 on the printing paper 113, a shutter 110, transport rollers 111 for transporting the printing paper 113, and a motor 112 for driving the transport rollers 111.

The light adjustment filter 107 and shutter 110 are controlled by the controller 102. Positions of the filters of light adjustment filter 107 and an opening time of the shutter 115, i.e. an exposure time, are controlled according to exposing conditions determined by the controller 102.

Figure 8:
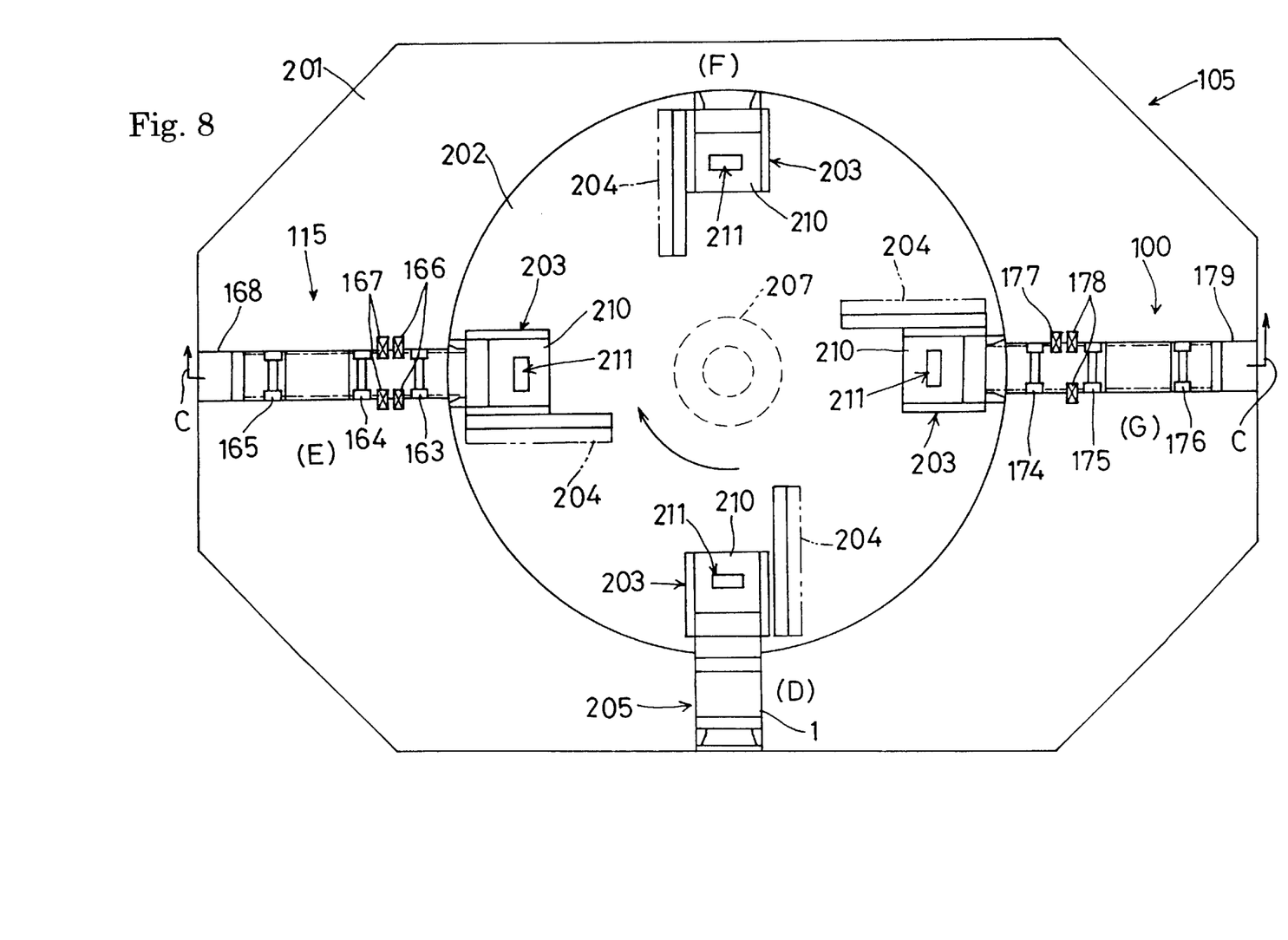
FIG. 8 is a plan view of a film transport device.

Next, a film transport device 105 and scanning station 115 will be described with reference to FIGS. 8 through 11. As shown in FIG. 8 which is a plan view, the film transport device 105 includes the printing station 100 and the scanning station 115 for reading the image information of film 2. The scanning station 115 has a scanning light source 116, a mirror tunnel 117, a reflecting mirror 118 and a CCD camera 119.

The respective components of film transport device 105 are mounted and supported on a base 201. A turntable 202 is disposed in a central position to be rotatable clockwise in FIG. 8. The turntable 202 supports loading units 203 arranged in four positions circumferentially thereof and each having a cartridge driver 204. Peripherally of turntable 202 is a cartridge loader 205 for loading the cartridge 1 and having a bar-code reader 205a for reading the cartridge ID. A cover 206 is provided to cover substantially the entire area of base 201 (see FIG. 11). A motor 207 is disposed under the central position of turntable 202 to drive the turntable 202.

Figure 9:
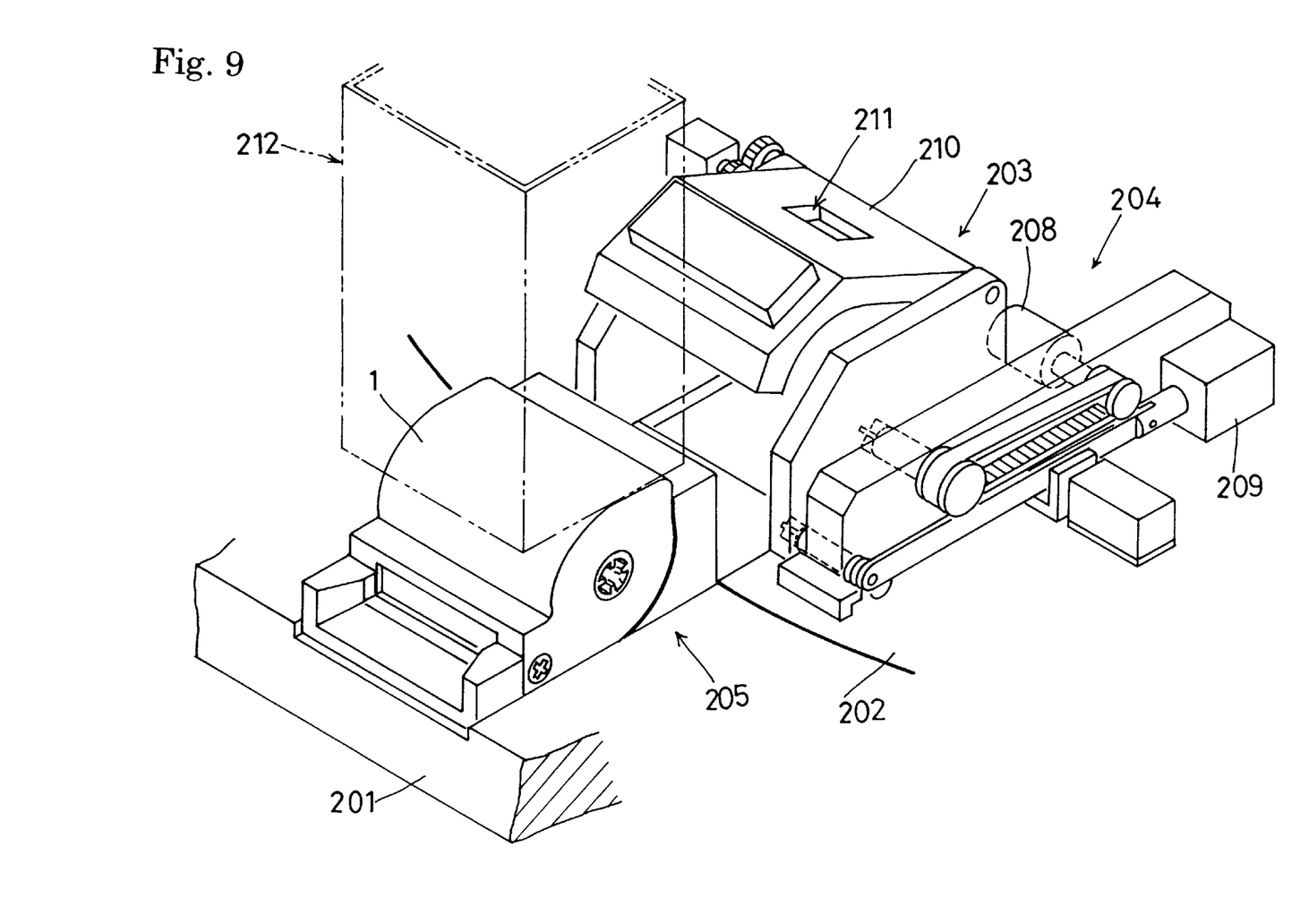
FIG. 9 is a perspective view of a cartridge loader and a loading unit of the film transport device.
Figure 10:
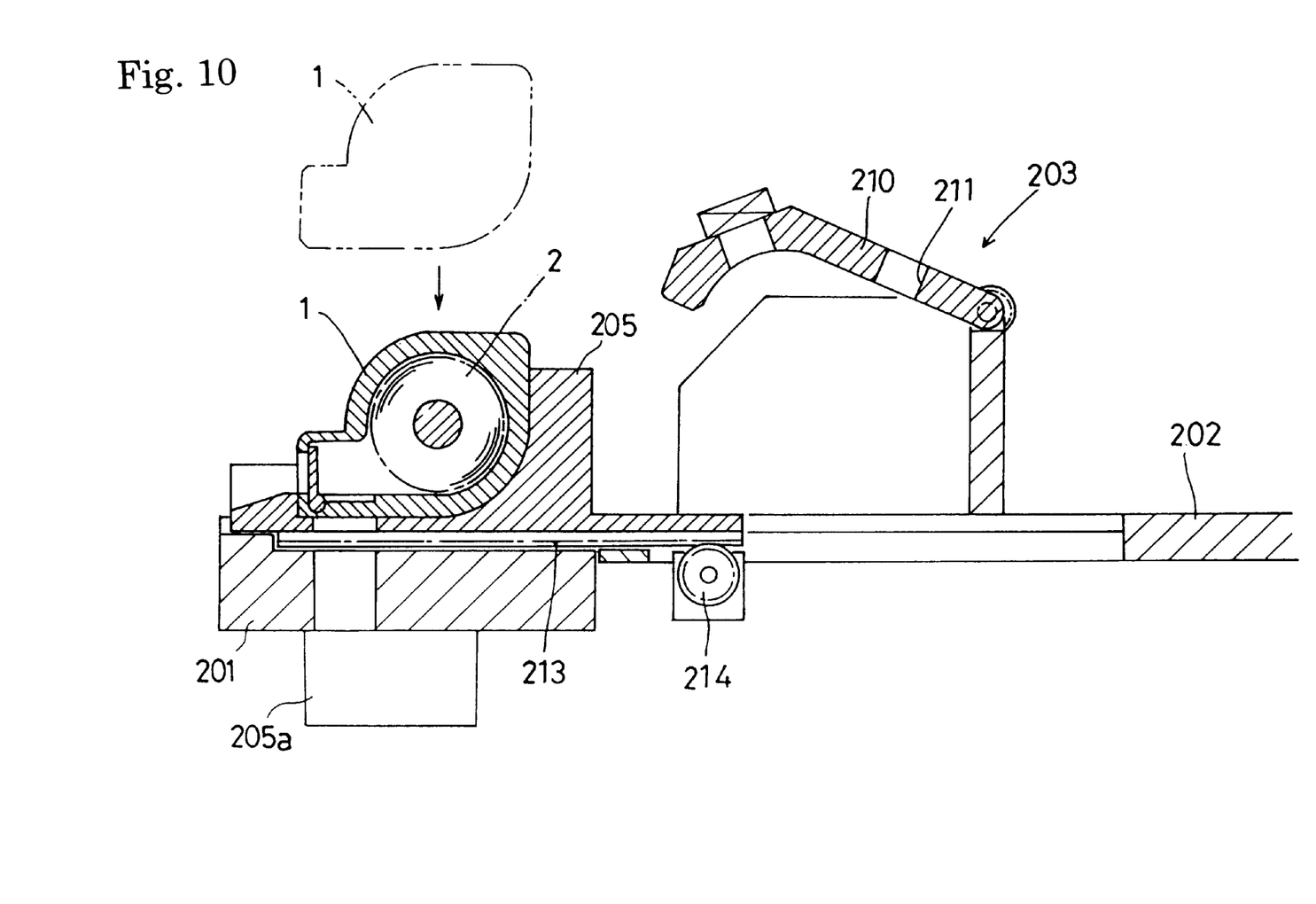
FIG. 10 sectional view of the cartridge loader and loading unit of the film transport device.

As shown in detail in FIG. 9, each cartridge driver 204 includes a motor 208 for drawing the film 2 out of the cartridge 1 and taking the film 2 into the cartridge 1, and a solenoid 209 for opening a light lock of cartridge 1. As shown in FIGS. 9 and 10, the loading unit 203 has a pivotable lid 210. The cartridge loader 205 has a cylindrical case 212 for storing cartridges 1 in a vertical arrangement. The cartridge 1 falling from the case 212 is transported to the loading unit 203 by a rack 213 and pinion 214.

Figure 11:
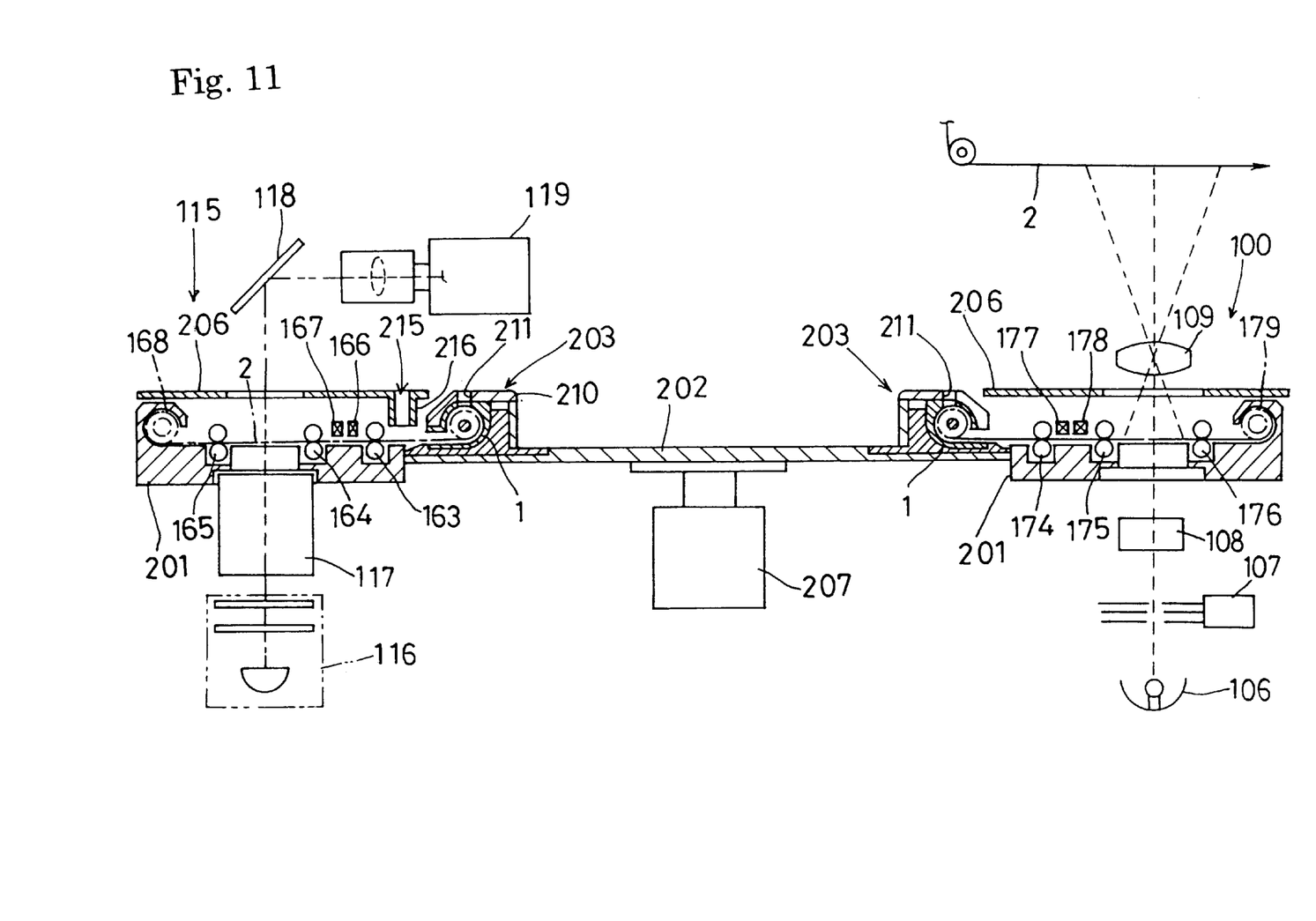
FIG. 11 is a sectional view of a printing station and a scanning station.

As shown in FIG. 11, the transport path of scanning station 115 includes transport rollers 163, 164 and 165, an optical sensor 166, and a magnetic head 167 acting as an information reader 167 for reading information such as the printing information recorded on the photographic film 2. A take-up device 168 is disposed at a terminal end of the transport path for temporarily winding up the film 2. The transport path of printing station 100 likewise includes transport rollers 174, 175 and 176, an optical sensor 177, a writing magnetic head 178 and a take-up device 179.

Though not shown in FIG. 11, the transporting line of each photo processing unit for transporting the photographic film 2 has a bar-code reader 23 for reading the film ID 2d, and transmitting, as necessary, the film ID 2d of photographic film 2 to be printed to the host computer 200 (see FIG. 2). The host computer 200 gives a warning to the operator when the printing information controlled by using the cartridge ID as a key indicates that the film ID 2d of photographic film 2 to be printed disagrees with the cartridge ID corresponding to the photographic film 2. Such a disagreement is caused by films and printing paper flowing in a wrong order when a recovery operation is carried out manually to in the event of a film transport trouble or the like.

Operation of this film transport device 105 will be described next.

The cartridge 1 storing the film 2 is fed from the cartridge loader 205 to the film transport device 105. First, in the position marked (D) in FIG. 8, the cartridge ID of cartridge 1 is read in the cartridge loader 205. The information on the cartridge ID is transmitted to the host computer 200 through the controller 102. When the bar-code reader 205a in the cartridge loader 205 fails to read the cartridge ID, this cartridge 1 is removed from the system. The cartridge ID is manually inputted from the console 103, and processing of the film 2 stored in this cartridge 1 is continued.

After the cartridge ID is read in the cartridge loader 205, the cartridge 1 is transferred to the loading unit 203. This transfer is carried out by the pinion 213 and rack 214. When the transfer to the loading unit 203 is completed, the lid 210 is closed. Thereafter, the turntable 202 is rotated 90 degrees clockwise to position (E) opposed to the scanning station 115 in FIG. 8. At this time, the host computer 200, in response to the information on the cartridge ID received from the cartridge loader 205, transmits a command to the controller 102 to instruct timing of discharging the photographic film 2 from the loading unit 203. Based on this timing command, the controller 102 transmits the photographic film 2 to the scanning station 115. Subsequently, the scanning station 115 reads the image information of film 2, and the information reader 167 reads the magnetic information.

The image information read is transmitted to the controller 102. Based on the image information read from the film 2, the controller 102 determines printing conditions for each frame. Each image expected to result from exposure made on the printing paper 113 with the printing conditions determined is simulated and displayed on the monitor 104.

The operator of the printer/processor 61 may observe images displayed on the monitor 104, and input instructions to correct the exposing conditions through the console 103 unless proper images are obtained. Then, the controller 102 corrects the exposing conditions based on the correcting instructions and determines final exposing conditions. When the processing at the scanning station 115 is completed, the turntable 202 transports the cartridge 1 through position (F) to position (G), i.e. the printing station 100 as shown in FIG. 8. Then, the image information of film 2 are printed, and the magnetic information is written. The data taken in at the scanning station 115 is transmitted to an index printer 220 as shown in FIG. 2, where the data is processed digitally for index printing. When the processing at the printing station 100 is completed, the turntable 202 returns the cartridge 1 to the cartridge loader 205, from which the cartridge 1 is transported to a delivery unit 70 shown in FIG. 1.

In the printing step, a communication is made with the host computer 200 to determine if the printing information, such as print size or trimming value, read by the information reader 167 is applicable to the frames to be exposed. If the printing information is applicable to the frames, an exposing process is performed by taking this printing information into account. Where the printing information, e.g. the number of prints, acquired through the receiving unit 20 is applicable to the frames to be exposed, an exposing process is performed by taking this printing information into account, and these frames are printed in the process acquired through the receiving unit 20. That is, the film images are printed on the printing paper based on the printing information acquired through the receiving unit 20, the printing information read by the information reader 167, and the above-mentioned printing conditions.

On the other hand, the cartridge ID and frame numbers read in the cartridge loader 205 are printed on the reverse surface of exposed printing paper 113 by a recorder 222. In the paper processor 101, the printing paper 113 is developed, and the developed printing paper 113, i.e. finished prints, is/are sorted into each order (a group of prints of images included in one photographic film 2), and transported to the delivery unit 70. A slip issue unit 225 is in communication with the host computer 200 through the network, and issues a slip based on printing result information such as the number of prints outputted from the printing station 100 of the printer/processor unit 61 and information inputted at the receiving unit 20.

The delivery unit 70 includes a transport device 71 and a delivery station 72. This transport device 71 may have the same basic construction as the transport device 50 shown in FIG. 6. At the delivery station 72, the photographic film 2 stored in the cartridge 1 transported from the printer/processor unit 61, the prints corresponding to the photographic film 21, the index print and the slip received from the slip issue unit 225 are collated with the cartridge ID, and collected in product packets for each customer transmitted directly from the receiving unit 20 as shown by a handling path P2 (FIG. 2). Such product packets are sorted for each agency 10. When the sorting is completed, the prints and cartridge 2 are forwarded to the agency 10.

What is claimed is:

1. A photographic printing system for a photographic film stored in a cartridge with a cartridge ID, comprising:

a first reader for reading, from an order slip having said cartridge ID applied thereto, first printing information including a frame number and print size, and said cartridge ID;

a first cartridge ID reader for reading said cartridge ID from said cartridge;

a host computer for storing said first printing information as associated with said cartridge ID based on the read information from said first reader and said first cartridge ID reader;

a cartridge loader for loading said cartridge, said cartridge loader having a second cartridge ID reader for reading said cartridge ID from said cartridge loaded into said cartridge loader;

a loading unit for drawing said photographic film out of said cartridge loaded into said cartridge loader;

a second reader for reading second printing information including trimming value recorded in said photographic film having drawn out of said cartridge, wherein said host computer generates and stores third printing information as associated with said cartridge ID based on the read information from said second cartridge ID reader and said second reader, said third printing information being a combination of said first printing information and said second printing information;

a printing processor for printing images of said photographic film on printing paper, and outputting printing result information; and film ID reader for reading a film ID recorded on said photographic film, wherein said host computer communicates, by using said cartridge ID as a key, with said printing processor in timed relationship with an operation thereof, to control said printing result information including the number of prints for each said cartridge ID, and wherein said host computer collates said film ID of said photographic film to be processed with said cartridge ID corresponding to said photographic film and gives an alarm when a disagreement occurs between said film ID and said cartridge ID.

2. A photographic printing system as defined in claim 1, further comprising a recorder for recording, on said printing paper, at least a portion of said third printing information, and said cartridge ID.

3. A photographic printing system as defined in claim 1, further comprising a slip issue unit for issuing a delivery slip, wherein said host computer generates delivery slip information based on said first printing information and said printing result information, and sends said delivery slip information to said slip issue unit.

4. A photographic printing system as defined in claim 3, further comprising a delivery unit for delivering a combination of said cartridge, finish prints, and said delivery slip issued by said slip issue unit, said delivery unit being capable of communicating with said host computer by using said cartridge ID as a key, to collate said cartridge, finish prints and said delivery slip based on said cartridge ID.

* * * * *